(12) United States Patent
Leweke et al.

(10) Patent No.: US 12,037,976 B2
(45) Date of Patent: Jul. 16, 2024

(54) METHOD FOR ACCELERATING THE DESTRUCTION OF HELICAL VORTICES IN THE WAKE OF A ROTOR OF A WIND TURBINE IN A WIND FARM

(71) Applicants: UNIVERSITÉ D'AIX-MARSEILLE, Marseilles (FR); CENTRE NATIONAL DE LA RECHERCHE SCIENTIFIQUE, Paris (FR); CENTRALE MARSEILLE, Marseilles (FR); DANMARKS TEKNISKE UNIVERSITET (DTU), Lyngby (DK)

(72) Inventors: Thomas Leweke, Marseilles (FR); Jens Sorensen, Bronshoj (DK)

(73) Assignees: UNIVERSITE D'AIX-MARSEILLE, Marseilles (FR); CENTRE NATIONAL DE LA RECHERCHE SCIENTIFIQUE, Paris (FR); CENTRALE MARSEILLE, Marseilles (FR); DANMARKS TEKNISKE UNIVERSITET (DTU), Lyngby (DK)

( * ) Notice: Subject to any disclaimer, the term of this patent is extended or adjusted under 35 U.S.C. 154(b) by 0 days.

(21) Appl. No.: 18/248,593

(22) PCT Filed: Oct. 8, 2021

(86) PCT No.: PCT/EP2021/077826
§ 371 (c)(1),
(2) Date: Apr. 11, 2023

(87) PCT Pub. No.: WO2022/078883
PCT Pub. Date: Apr. 21, 2022

(65) Prior Publication Data
US 2023/0374968 A1    Nov. 23, 2023

(30) Foreign Application Priority Data

Oct. 13, 2020   (EP) ..................................... 20201519

(51) Int. Cl.
*F03D 1/06*    (2006.01)
*F03D 7/04*    (2006.01)

(52) U.S. Cl.
CPC ........... *F03D 1/0633* (2013.01); *F03D 7/049* (2023.08); *F05B 2240/307* (2020.08); *F05B 2240/96* (2013.01); *F05B 2270/204* (2020.08)

(58) Field of Classification Search
CPC ........ F03D 1/0633; F03D 7/049; F03D 7/024; F05B 2240/307; F05B 2240/96;
(Continued)

(56) References Cited

U.S. PATENT DOCUMENTS

| 11,391,264 B2 * | 7/2022 | Manceau ................ F03D 1/025 |
| 2007/0286728 A1 * | 12/2007 | Hotto .................... F03D 1/0675 |
| | | 416/1 |

(Continued)

FOREIGN PATENT DOCUMENTS

| CH | 714302 A2 | 5/2019 |
| CN | 207212580 U | 4/2018 |

(Continued)

OTHER PUBLICATIONS

International Search Report dated Dec. 13, 2021 for corresponding International Application No. PCT/ EP2021/077826, filed Oct. 8, 2021.

(Continued)

*Primary Examiner* — Aaron R Eastman
(74) *Attorney, Agent, or Firm* — David D. Brush; Westman, Champlin & Koehler, P.A.

(57) ABSTRACT

A wind farm/park having a plurality of spatially distributed wind turbines, including at least one upstream wind turbine and at least one downstream wind turbine. Each wind turbine includes a rotor with at least two blades. At least one downstream wind turbine is affected under certain wind conditions by a wake region generated by the upstream wind turbine and containing helical vortex structures formed at the tip of the blades of the upstream wind turbine. A geometry or configuration of one or more of the rotor blades of the upstream wind turbine is different from a geometry or configuration of the other blade(s) of the upstream wind turbine thereby creating a fixed asymmetry in the blade configuration so as to accelerate destruction of vortices in (Continued)

the wake of the rotor of the upstream wind turbine by exciting a natural instability of the blade tip vortices.

11 Claims, 4 Drawing Sheets

(58) Field of Classification Search
CPC ............ F05B 2270/204; F05B 2240/30; F05B 2240/305; Y02E 10/72
See application file for complete search history.

(56) References Cited

U.S. PATENT DOCUMENTS

| | | | | |
|---|---|---|---|---|
| 2009/0022589 A1* | 1/2009 | Sorensen | ............... | F03D 7/0276 416/41 |
| 2009/0099702 A1* | 4/2009 | Vyas | .................... | F03D 7/0292 290/55 |
| 2012/0321481 A1* | 12/2012 | DeJesus | ................. | F03B 3/126 416/241 R |
| 2014/0207297 A1* | 7/2014 | Betran Palomas | .... | G05B 15/02 700/287 |
| 2019/0383261 A1 | 12/2019 | Bader et al. | | |

FOREIGN PATENT DOCUMENTS

| | | |
|---|---|---|
| DE | 102013002054 A1 | 8/2014 |
| EP | 2757255 A1 | 7/2014 |

OTHER PUBLICATIONS

Written Opinion of the International Searching Authority dated Dec. 13, 2021 for corresponding International Application No. PCT/EP2021/077826, filed Oct. 8, 2021.

Extended European Search Report dated Mar. 26, 2021 for corresponding European Application No. 20201519.4, filed Oct. 13, 2020.

\* cited by examiner

METHOD FOR ACCELERATING THE DESTRUCTION OF HELICAL VORTICES IN THE WAKE OF A ROTOR OF A WIND TURBINE IN A WIND FARM

CROSS-REFERENCE TO RELATED APPLICATIONS

This Application is a Section 371 National Stage Application of International Application No. PCT/EP2021/077826, filed Oct. 8, 2021, which is incorporated by reference in its entirety and published as WO 2022/078883 A1 on Apr. 21, 2022, in English.

FIELD OF THE INVENTION

The invention relates generally to the field of wind turbines, and more specifically to the improvement of power production efficiency of a wind farm having a plurality of wind turbines and to the reduction of vibration fatigue of these wind turbines.

More particularly, the invention relates to a method for accelerating the destruction of helical vortices in the wake of a rotor of at least one first wind turbine which may affect at least a second wind turbine located downstream, in order to increase the power production efficiency of a wind farm and reduce fatigue due to vibrations caused by vortex interactions.

BACKGROUND OF THE INVENTION

Because the reduction of $CO_2$ emissions has been an urgent problem to be solved throughout the world, in order to combat global warming, and knowing that fossil fuels such as petroleum will be depleted in the near future, the share of wind power in the total electricity production has grown significantly during the last decades. Wind power can be generated in so-called wind farms or parks wherein wind turbines convert the power of the wind to electricity. Wind farms are created when multiple wind turbines are placed in the same geographic area for the purpose of generating large amounts of electrical power. In the present disclosure, a wind farm is to be regarded as a cluster of two or more wind turbines.

In the case of three-bladed horizontal-axis wind turbines, vortices form in the tip and root regions of each blade, resulting in three helical tip vortices and a counter-rotating hub vortex. This vortex system can persist over a large distance behind the wind turbine, before a natural instability phenomenon deforms the vortices, leading to a breakdown into a wake with small-scale turbulent structures. This overall development of a wind turbine wake is shown schematically in FIG. 1.

In a wind turbine wake, the wind speed is reduced because of the extraction of kinetic energy from the wind by the wind turbine rotor. The reduced wind speed persists as long as the helical tip vortex system is present. When the vortex system breaks up and a more turbulent flow develops, the wake recovers kinetic energy through mixing with the outer flow.

The power output of each wind turbine varies with the wind speed it is exposed to. If the turbine is placed downstream of another wind turbine, the power output is influenced by the wake of the upstream turbine, thus affecting the overall power production of the wind farm.

In addition, the wake from one turbine impacting a second downstream wind turbine may cause fatigue loads (particularly vibrations) on the blades of the second turbine, which reduces its lifetime. These loads are particularly strong if the flow contains large-scale vortical structures as in the near wake of a wind turbine rotor. Fluid-structure interactions with these vortices may also induce fatigue in other components of the wind turbine, which further reduces its lifetime and/or performance.

In a wind farm, there may be a relatively short distance between wind turbines, in the direction of the wind, depending on this direction and the wind farm layout. Two examples of such a situation are shown in FIG. 2 and FIG. 3. In these cases, the second turbines, facing the wind, can be exposed to the helical vortex wake of the first turbines and experience the two aforementioned negative effects: reduced incoming wind speed and strong loads from the tip vortex system of the upstream turbines. In view of the negative influence caused by the helical vortices, there is a need for a solution to reduce this influence, in order to increase the power production efficiency of the wind farm and the overall lifetime of its turbines.

It should be noted that the helical vortex system persists mainly behind the first turbines facing the wind, since they are exposed to the unperturbed wind. Other downstream turbines experience a wind that is reduced and strongly perturbed by the wake of the upstream turbine, so that their own wakes are turbulent almost from the start as shown in FIG. 2 and FIG. 3. Therefore, the most benefit is obtained by accelerating the breakup of the helical vortex system of the first turbines exposed to the wind in a wind farm, and this benefit will be most notable for the second turbines, facing the wind. The evolution and breakdown dynamics of helical vortices, such as those in the near wake of a wind turbine rotor, have been studied extensively. Various instability phenomena leading to the amplification of perturbations, and eventually to the breakdown of these systems into turbulent motion, have been identified. The present invention is based on the knowledge about these physical phenomena. One of them is a displacement instability, which naturally amplifies deviations from the symmetric system of three interlaced helical vortices. Behind a standard wind turbine rotor, these deviations are initially very small, which is why it takes a long time (i.e. a large downstream distance) for the instability to amplify them up to a breakup.

SUMMARY OF THE INVENTION

The invention concerns a wind farm/park having a plurality of spatially distributed wind turbines, each of which comprises a rotor with at least two blades, said wind park comprises at least one upstream wind turbine and one or more downstream wind turbines, wherein said at least one downstream wind turbine is affected under certain wind conditions by a wake region generated by said at least one upstream wind turbine and containing helical vortex structures formed at the tip of the blades of said at least one upstream wind turbine, wherein the geometry or configuration of one or more of the plurality of rotor blades of said at least one upstream wind turbine is different from the geometry or configuration of the other blade(s) of said at least one upstream wind turbine thereby creating a fixed asymmetry in the blade configuration so as to accelerate the destruction of said vortices in the wake of the rotor of said upstream wind turbine by exciting a natural instability of the said blade tip vortices. The invention aims at inducing larger deformations of the vortex system from the start, by introducing various types of asymmetry in the rotor geometry. With such an initial condition, the natural breakup will occur faster, i.e. closer behind the rotor.

The invention proposes to speed up the destruction of the helical vortices that are created at the tip of wind turbine blades of the first turbines exposed to the wind in a wind farm and which are harmful to the operation of a wind farm. The elimination of these vortices is accelerated by introducing a perturbation of the helical symmetry of the tip vortices. This perturbation is then amplified by a natural instability of the vortex system, which has the effect of accelerating the destruction of the vortices. The perturbation is created by introducing a fixed or permanent (i.e. not time dependent) asymmetry in the rotor geometry, modifying one or more blades of the first wind turbine of a wind farm facing the wind, or of several wind turbines of a wind farm constituting the first row of turbines facing the wind. In other words, the blades of a rotor are not configured in the same way, one or more blades having an external geometry that is different from the external geometry of the other blades. According to a particular implementation of the invention, one or more blades of the turbine(s) constituting the second row of turbines are also modified. This can prove useful when the wind is not aligned with the rows of turbines in particular, the wind blowing obliquely to the grid (see FIG. 3).

In other words, an asymmetric disturbance is introduced by modifying the configuration of one or more blades of the rotor by modifying their geometry passively (e.g., lengthening or shortening of the blades, adding winglets or flaps, changing the azimuthal position), or By breaking up the helical tip vortex system, the power loss of the downstream turbines and the high fatigue loads on these turbines are reduced, and the power production efficiency of the wind farm and the wind turbine lifetime are increased.

It is to be noted that the approach of the invention is different from the technique known as power curtailment of wind turbine farms, configured to maximize the output power.

According to an aspect of the invention, the geometry or configuration of one or more of the plurality of rotor blades of said at least one upstream wind turbine is different from the geometry or configuration of the other blade(s) of said wind turbine.

According to an aspect of the invention, the length of one or more of the plurality of rotor blades of said at least one upstream wind turbine is different from the length of the other blade(s) of said at least one upstream wind turbine.

According to an aspect of the invention, one or more of the plurality of rotor blades of said at least one upstream wind turbine is positioned so that the azimuthal angles between the blades of said at least one upstream wind turbine are not constant.

According to an aspect of the invention, one or more of the plurality of rotor blades of said at least one upstream wind turbine comprises a winglet at its tip.

According to an aspect of the invention, the pitch of one or more of the plurality of rotor blades of said at least one upstream wind turbine is different from the pitch of the other blade(s).

According to an aspect of the invention, the load of one or more of the plurality of rotor blades of said at least one upstream wind turbine is distributed differently than the load on the other blade(s).

According to an aspect of the invention, one or more of the plurality of rotor blades of said at least one upstream wind turbine is axially bent.

According to an aspect of the invention, the center of the rotor of said at least one upstream wind turbine is radially offset from the axis of rotation of said rotor, thereby creating an asymmetry in the blade configuration.

According to an aspect of the invention, one or more flow modification devices are disposed on one or more blades of the upstream wind turbine.

According to an aspect of the invention, said at least one device is a flap disposed fixedly on said corresponding blade.

The invention also concerns a wind turbine intended to be installed in a wind farm/park as described previously, comprising a plurality of rotor blades, the geometry or configuration of one or more of the plurality of rotor blades of said at least one upstream wind turbine being different from the geometry or configuration of the other blade(s) of said at least one upstream wind turbine thereby creating a fixed asymmetry in the blade configuration so as to accelerate the destruction of said vortices in the wake of the rotor of said upstream wind turbine by exciting a natural instability of the said blade tip vortices.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DETAILED DESCRIPTION

Exemplary embodiments of a wind park, a method for accelerating the destruction of helical vortices in the wake of a wind turbine rotor and various types of asymmetry in the rotor geometry in accordance with the present invention are described in detail below, with reference to the accompanying figures. It is appreciated that the exemplary embodiments described below can be modified in various aspects without changing the essence of the invention.

Figures 1, 2:
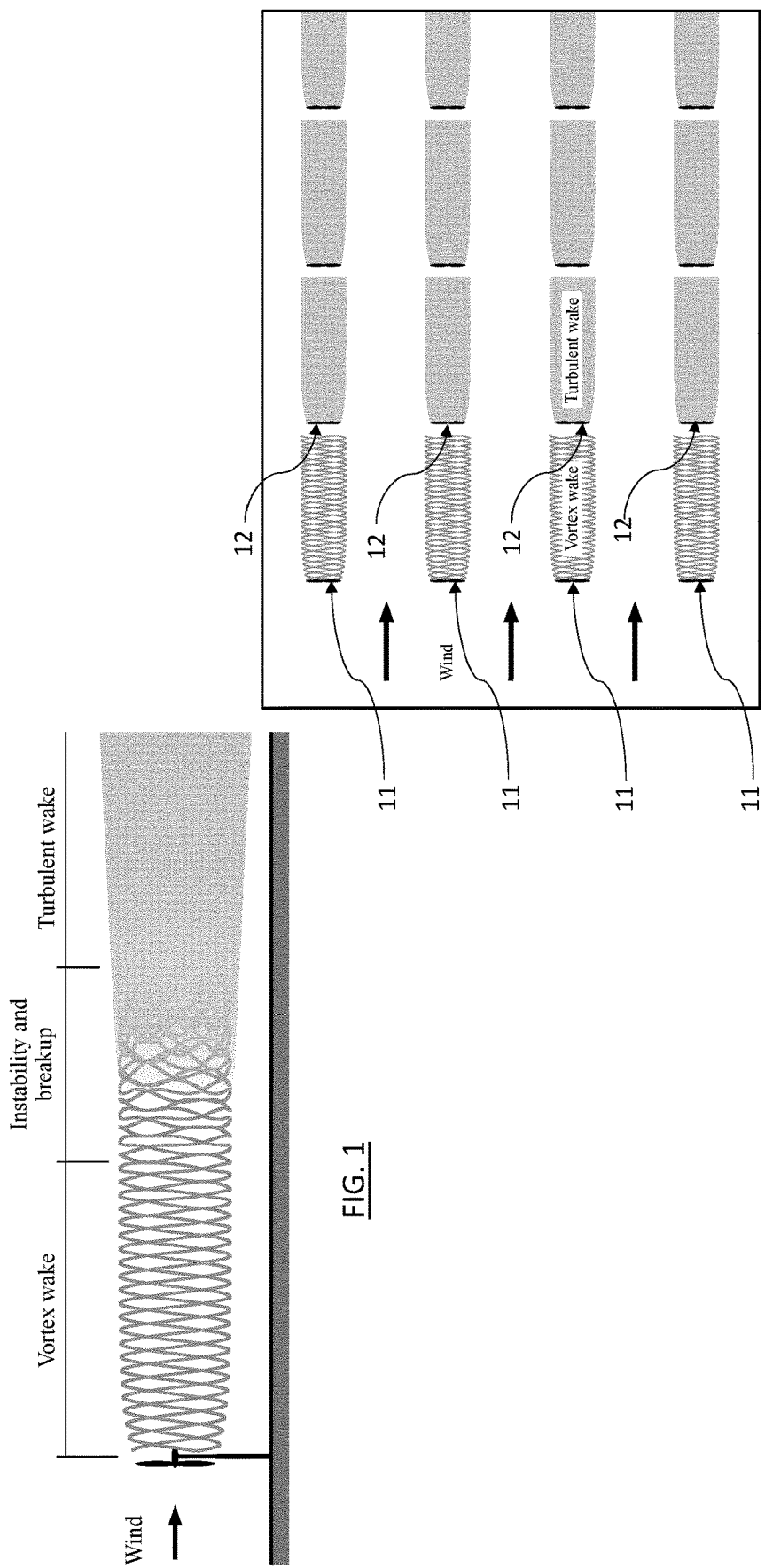
FIG. 1 is a schematic drawing depicting the structure and evolution of the wake of a three-bladed horizontal-axis wind turbine.
FIG. 2 is a schematic drawing depicting a first implementation of the invention in a wind farm/park having a plurality of spatially distributed wind turbines.

FIG. 2 is a configuration diagram of a wind farm according to a first embodiment of the invention including a plurality of horizontal axis wind turbines disposed in several rows, the wind blowing along a line of the layout grid.

Each wind power generation apparatus generates electric power on receiving the energy of a wind. Individual wind power generation apparatuses are connected to each other via a power transmission line and supply the generated electric power to a power system.

Each horizontal axis wind turbine includes a tower, generator, gearbox, nacelle, and a rotor comprising one or more rotor blades, usually three, radially mounted on the rotor. The tower supports the nacelle to make the nacelle rotatable in its yaw movement. The rotor is set into rotation around a horizontal axis under the influence of the wind on the blades, and the blades capture kinetic energy from the wind using known airfoil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid. The gearbox (if present) and the generator are usually mounted in a nacelle on top of a wind turbine tower. To achieve optimum conversion of wind power into electrical power the rotor axis is aligned with the wind direction.

In FIG. 2, the first wind turbines 11 of the first or upstream row are considered upstream of the second wind turbines 12 of the second row for the shown wind direction from left to right.

The figure shows the inflow impacting the first wind turbines 11 facing the wind and the outflow coming out of the same turbines in the form of a vortex wake formed by the helical tip vortices.

As mentioned previously, in wind parks, a second wind turbine 12 of the second or downstream row of wind turbines can be affected by the wake region (outflow) of the first wind turbine 11 which is positioned upstream of the second wind turbine 12. It should be noted that the word 'first' and 'second' depends on the direction of the wind, meaning that a wind turbine is defined as being 'first' if it is exposed to the incoming free wind, whereas the word 'second' refers to a turbine located in the wake of the first turbine.

The wake region is a region of increased turbulence downstream of the first wind turbine in which the downstream second wind turbine is located. The wake region may be approximately symmetric to the rotational axis if the rotational axis is aligned with the wind direction. In other words, the upstream first wind turbine casts a wake onto the second turbine located downstream, thereby influencing the wind impinging on this downstream turbine, which is of reduced speed and energy, and thus affecting the overall power production of the wind farm.

On the other hand, the concentrated vortices that are generated at the tips of the first wind turbine blades and transported in the wake in the form of interlaced helical vortices interact with the blades of downstream wind turbines and create vibrations and wear, reducing their service life.

In the prior art, the geometry of wind turbine rotors, and consequently the structure of the vortices in their wake, are symmetrical.

By contrast, the present invention consists in introducing a fixed asymmetry in the wind turbine rotors, especially those of the first row facing the wind, so as to cause a destabilization of the tip vortices. Thus, the solution of the invention implements a fixed or permanent modification of one or two blades of a rotor.

The present invention aims at accelerating the disintegration of vortices that form at the tips of the blades of a rotor (called "helical tip vortices"). The destruction of the helical vortices reduces the impact on the blades of subsequent wind turbines, and consequently their wear, and promotes mixing between the outside flow and the wake of the first wind turbine, thereby re-injecting energy into that wake (since the mixing of the wake of each rotor with the external flow gives back to the airflow a part of the energy lost during its passage through the rotor) and increasing the efficiency of the other wind turbines downstream.

The destruction of vortices that are created at the tip of the blades, and which are harmful to the operation, is obtained by the excitation of a natural phenomenon of instability, which is created by introducing one or two blades having a different design (geometry) or configuration than the other blade(s) of the same rotor. The modification of the geometry and/or configuration of at least one blade is basically fixed (permanent, stationary) during operation, i.e. not time-dependent.

As shown in FIGS. 4 to 9, this distinct design can be obtained by having in a three-bladed wind turbine one or two blades of different geometry than the other blade(s) of the same rotor, thus introducing a fixed or permanent asymmetry in the rotor geometry, or by having one or two blades comprising one or more devices.

The solution of the invention is therefore useful to provide more wind power for the following turbine(s), to increase the efficiency of turbines in wind farms and to reduce their fatigue.

In other words, a disturbance is introduced by adding a dissymmetry in the geometry of a rotor having at least two blades.

This is done by passive means:
  by choosing a different length for on one or more blades of a rotor,
  by providing an angular offset for one or more blades of a rotor,
  by providing a blade tip device (winglet) on one or more blades of a rotor, or different blade tip devices for each blade of a rotor,
  by adding a fixed flap on the trailing edge of one or more blades of a rotor, or different fixed flaps on each of the blades of a rotor,
  by axially bending one or more blades, which can be achieved, e.g., by having blades of different stiffness,
  by varying the pitch of one or more blades of a rotor, or by choosing a different pitch for each blade of a rotor, or
  by distributing the load on the blades of a rotor differently, e.g. by providing different geometries for each blade of a rotor: the chord and angle of attack of each blade may, for instance, vary differently for each blade as a function of the radius.

In other words, the solution of the invention aims at exciting natural instabilities of helical vortices by adding particular perturbations that act on the blade tip vortices. This reinforces the instability of the tip vortices and accelerates the destruction of the rotor wake through the instability of the blade tip vortices.

In order to reduce production losses caused by wind turbine wakes in wind farms, the proposed method uses a natural instability to modify the wake of a wind turbine. The disturbances required to excite it are very small, their growth then occurs by itself. As mentioned before, the necessary devices are passive and therefore are easy to install and operate. Existing wind turbines can be retrofitted with these devices.

Figure 3:
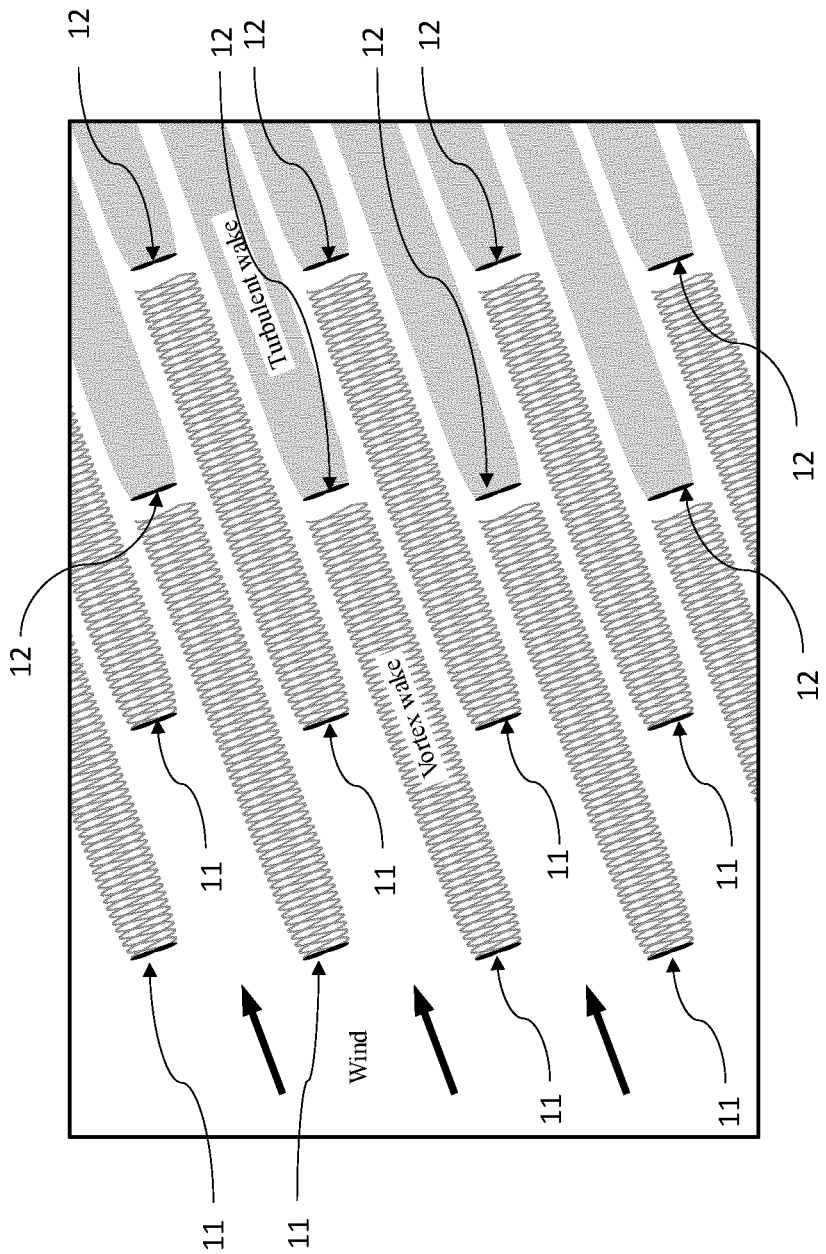
FIG. 3 is a schematic drawing depicting a second implementation of the invention in a wind farm/park having a plurality of spatially distributed wind turbines.

FIG. 3 is a schematic drawing depicting a second implementation of the invention in a wind farm/park having a plurality of spatially distributed wind turbines. The wind farm layout is the same as in FIG. 2, but the wind direction is now not aligned with the lines of the grid. The rotor of each of the turbines of the park has been pivoted so as to face the wind, and so that the rotor axes of all the turbines are aligned with the wind direction. In this case, wind turbines in the first and second rows referenced 11 are considered as 'first' facing the wind, so that asymmetries in accordance with the invention are introduced on all of these wind turbines 11, in order to destabilize their helical vortex wakes and thereby increase the efficiency of the wind park and reduce wind turbine fatigue loads. The first wind turbines 11 are considered upstream of the second wind turbines 12.

FIG. 4 to FIG. 9 are schematic drawings showing different examples of one or two blades of a three-bladed wind turbine being configured differently than the other blade(s) of said wind turbine, in accordance with the invention.

These examples may be implemented in other multiple-bladed wind turbines.

Figure 4:
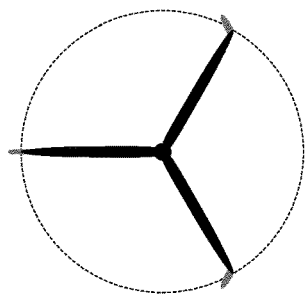
FIG. 4 is a schematic drawing showing a first example of one or two blades of a wind turbine being configured differently than a third blade, in accordance with the invention.
Figure 4:
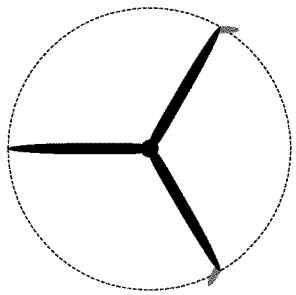
Figure 4:
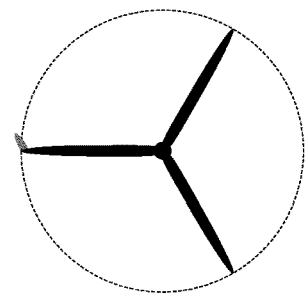

One possible implementation is to install a winglet at the tip of one or more blades, or to equip each blade tip with a winglet of different shape or orientation. Such blades can be incorporated in a two-bladed wind turbine or a three-bladed wind turbine, for instance. FIG. 4 illustrates the different cases mentioned above for a three-bladed rotor, from left to right, respectively.

Figure 5:
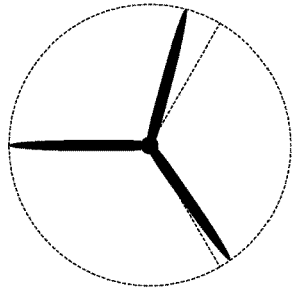
FIG. 5 is a schematic drawing showing a second example of one or two blades of a wind turbine being configured differently than a third blade, in accordance with the invention.
Figure 5:
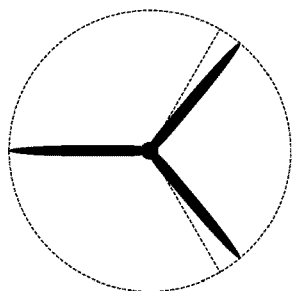
Figure 5:
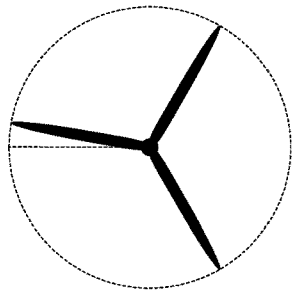
Figure 6:
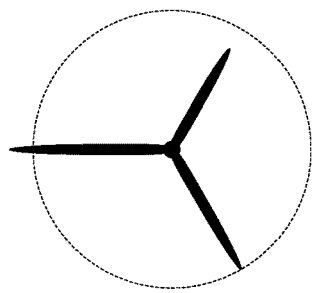
FIG. 6 is a schematic drawing showing a third example of one or two blades of a wind turbine being configured differently than a third blade, in accordance with the invention.
Figure 6:
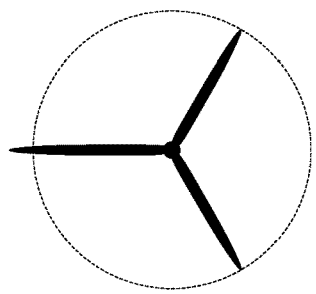

FIG. 5 illustrates another implementation consisting in introducing an angular (azimuthal) blade offset. From left to right, an azimuthal offset is implemented on one blade, a symmetric offset of two blades and an arbitrary offset of two blades FIG. 6 illustrates another implementation consisting in introducing variable blade lengths. On the left, one blade has a different length (longer, but it could be shorter) than the others. On the right, all blades have different lengths.

Figure 7:
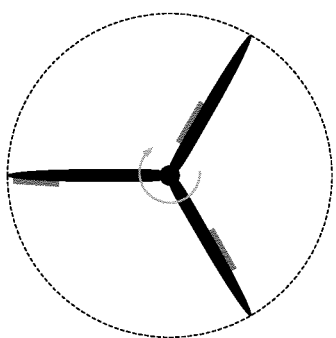
FIG. 7 is a schematic drawing showing a fourth example of one or two blades of a wind turbine being configured differently than a third blade, in accordance with the invention.
Figure 7:
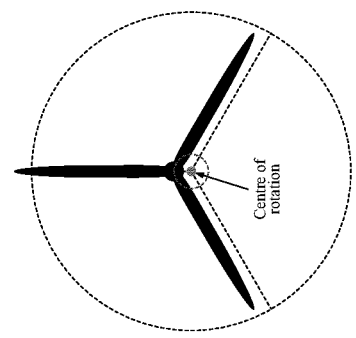

FIG. 7 illustrates another implementation consisting in introducing trailing edge flaps, which are fixed. From left to right, one blade is equipped with a trailing edge flap, two blades are equipped with flaps and different flaps are implemented on each blade, respectively.

Figure 8:
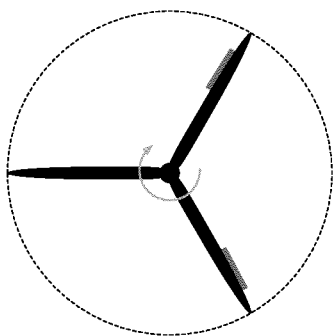
FIG. 8 is a schematic drawing showing a fifth example of one blade of a wind turbine being configured differently than the other blades, in accordance with the invention.
Figure 8:
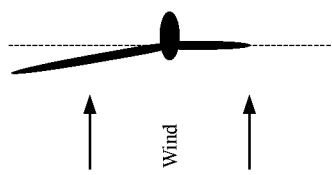
Figure 8:
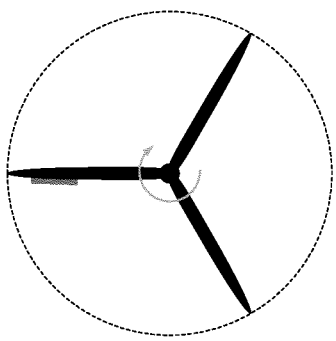
Figure 8:
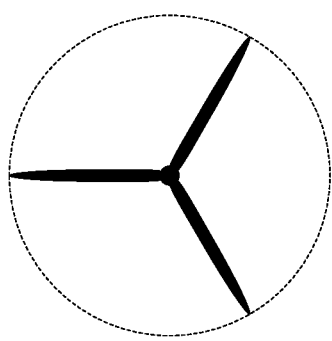

FIG. 8 illustrates another implementation (front view on the left and side view on the right) consisting in axially bending one blade.

Figure 9:
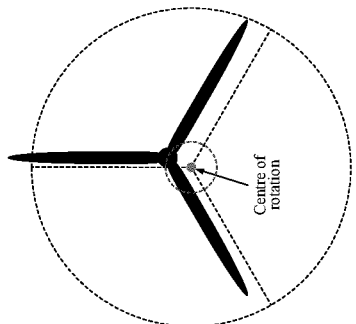
FIG. 9 is a schematic drawing showing a sixth example of configuring the rotor of a wind turbine asymmetrically, in accordance with the invention.

FIG. 9 illustrates another implementation consisting in introducing a radial rotor offset with respect to the centre of rotation of the rotor. On the left-hand side, a radial offset of the entire rotor is introduced along one blade. On the right-hand side, a radial offset of the entire rotor is introduced in an arbitrary direction.

In summary, the present invention provides for a procedure consisting in configuring in a permanent manner one or more blades of a wind turbine rotor differently from the other blade(s) of the same turbine. The same arrangement may be applied to all upstream wind turbines of a wind park, forming the first row of wind turbines facing the wind, comprising multiple wind energy turbines. In a particular embodiment, the same arrangement may be applied to the wind turbines of a wind park forming the second row of wind turbines, downstream of the first row of wind turbines, which under specific wind conditions is also 'first facing the wind'.

This has direct consequences in wind farms where wake interactions with downstream turbines may introduce dynamic blade loading and lead to a decrease in wind farm performance for certain wind directions.

Therefore, in a wind farm, by modifying permanently the configuration of one or more blades of one or more wind turbines in the first row facing the wind, it is possible to destabilize the helical vortices formed at the tip of the blades of said one or more wind turbines and accelerate the destruction of helical vortices in the wake of said one or more wind turbines, so as to reduce wake losses of the wind turbine generators disposed on the downstream side, and minimize reduction of the power generation amount.

Applications include horizontal axis wind turbines in particular, the vast majority of which have three-bladed rotors.

The invention claimed is:

1. A wind farm/park comprising:
a plurality of spatially distributed wind turbines, including at least one upstream wind turbine and at least one downstream wind turbine, wherein:
each of the wind turbines comprises a rotor with a plurality of blades,
said at least one downstream wind turbine is affected by a wake region generated by said at least one upstream wind turbine and containing helical vortex structures formed at a tip of the blades of said at least one upstream wind turbine, and
one or more of the plurality of rotor blades of said at least one upstream wind turbine comprises a geometry or configuration that is different from a geometry or configuration of the other blade or blades of said at least one upstream wind turbine thereby creating a fixed asymmetry in the rotor's blade configuration so as to accelerate a destruction of vortices in the wake of the rotor of said at least one upstream wind turbine by exciting a natural instability of vortices generated at the tip of the plurality of rotor blades.

2. The wind farm/park according to claim 1, wherein a length of one or more of the plurality of rotor blades of said at least one upstream wind turbine is different from a length of the other blade or blades of said at least one upstream wind turbine.

3. The wind farm/park according to claim 1, wherein one or more of the plurality of rotor blades of said at least one upstream wind turbine is positioned so that azimuthal angles between the blades of said at least one upstream wind turbine are not constant.

4. The wind farm/park according to claim 1, wherein one or more of the plurality of rotor blades of said at least one upstream wind turbine comprises a winglet at its tip.

5. The wind farm/park according to claim 1, wherein a pitch of one or more of the plurality of rotor blades of said at least one upstream wind turbine is different from a pitch of the other blade or blades of said at least one upstream wind turbine.

6. The wind farm/park according to claim 1, wherein a load of one or more of the plurality of rotor blades of said at least one upstream wind turbine is distributed differently than a load on the other blade or blades of said at least one upstream wind turbine.

7. The wind farm/park according to claim 1, wherein one or more of the plurality of rotor blades of said at least one upstream wind turbine is axially bent.

8. The wind farm/park according to claim 1, wherein a center of the rotor of said at least one upstream wind turbine is radially offset from an axis of rotation of said rotor of said at least one upstream wind turbine.

9. The wind farm/park according to claim 1, further comprising one or more flow modification devices disposed on one or more of the plurality of rotor blades of the at least one upstream wind turbine.

10. The wind farm/park according to claim 9, wherein said at least one flow modification device comprises a flap disposed fixedly on said corresponding blade.

11. A wind turbine configured to be installed upstream of one or more downstream wind turbines in a wind farm/park, said upstream wind turbine comprising:
   a rotor; and
   a plurality of rotor blades of the rotor, wherein one or more of the plurality of rotor blades of said upstream wind turbine comprises a geometry or configuration that is different from a geometry or configuration of the other blade or blades of said upstream wind turbine thereby creating a fixed asymmetry in the rotor's blade configuration so as to accelerate destruction of vortices in a wake of the rotor of said upstream wind turbine by exciting a natural instability of vortices generated by a tip of the plurality of rotor blades.

* * * * *